(12) United States Patent
Sudbrink et al.

(10) Patent No.: US 10,448,553 B2
(45) Date of Patent: Oct. 22, 2019

(54) TRANSPORT LOAD SPREADING DEVICE

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 683 days.

(21) Appl. No.: 15/148,361

(22) Filed: May 6, 2016

(65) Prior Publication Data
US 2017/0318730 A1 Nov. 9, 2017

(51) Int. Cl.
*A01B 63/22* (2006.01)
*A01B 19/02* (2006.01)

(52) U.S. Cl.
CPC .............. *A01B 63/22* (2013.01); *A01B 19/02* (2013.01)

(58) Field of Classification Search
CPC ..................................................... A01B 63/22
USPC ....................................................... 172/423
See application file for complete search history.

(56) References Cited

U.S. PATENT DOCUMENTS

| | | | |
|---|---|---|---|
| 2,306,744 A | 12/1942 | Morkoski | |
| 2,780,475 A * | 2/1957 | Koerner | A01B 23/04 |
| | | | 280/414.5 |
| 3,534,819 A * | 10/1970 | Grover | A01B 23/043 |
| | | | 172/316 |
| 4,350,211 A | 9/1982 | Coufal | |
| 4,450,917 A * | 5/1984 | Hake | A01B 63/22 |
| | | | 172/328 |
| 4,492,272 A | 1/1985 | Jensen | |
| 4,519,460 A | 5/1985 | Gust | |
| 4,790,389 A | 12/1988 | Adee et al. | |
| 4,821,811 A | 4/1989 | Swenson | |
| 5,020,604 A | 6/1991 | Peck | |

(Continued)

FOREIGN PATENT DOCUMENTS

WO 2012/036619 A1 3/2012

OTHER PUBLICATIONS

"Your Soil is Your Most Important Asset", Primary Tillage Soil Management Systems, John Deere, Mar. 1, 2016 (30 pages).

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

An agricultural or industrial implement has a main frame including longitudinal and cross frame members. Rear main lift wheels are connected to rear lift wheel arms that are pivotally connected to the main frame and can be raised and lowered using a hydraulic lift cylinder. The hydraulic lift cylinder is connected to a center pivot of a lug. The lug has a lower connection point connected to a lug anchor, which is connected to a rear cross frame member. The lug also has an upper connection point connected to two load members. One load member extends diagonally forward from the upper connection point and connects to one of the longitudinal frame members located to the left of the lug. Another load member extends diagonally forward from the upper connection point and connects to one of the longitudinal frame members located to the right of the lug.

14 Claims, 6 Drawing Sheets

(56) References Cited

U.S. PATENT DOCUMENTS

| | | | |
|---|---|---|---|
| 5,535,832 A * | 7/1996 | Benoit | A01B 49/02 |
| | | | 172/195 |
| 6,068,062 A | 5/2000 | Brueggen et al. | |
| 6,260,630 B1 | 7/2001 | Friggstad | |
| 6,679,339 B1 * | 1/2004 | Steinlage et al. | A01B 63/22 |
| | | | 172/395 |
| 6,758,284 B2 | 7/2004 | Myers | |
| 7,543,657 B2 | 6/2009 | Friggstad | |
| 2015/0156958 A1 | 6/2015 | Sudbrink et al. | |

* cited by examiner

TRANSPORT LOAD SPREADING DEVICE

BACKGROUND OF THE INVENTION

1. Field of the Invention

The present invention relates to agricultural implements, and, more particularly, to lift mechanisms for agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Tillage equipment prepares the soil by way of mechanical agitation of various types, such as digging, stirring, and overturning. Examples of which include ploughing (overturning with moldboards or chiseling with chisel shanks), rototilling, rolling with cultipackers or other rollers, harrowing, and cultivating with cultivator shanks. Tillage is often classified into two types, primary and secondary. There is no strict definition of these two types, perhaps a loose distinction between the two is that tillage that is deeper and more thorough is thought of as primary, and tillage that is shallower is thought of as secondary. Primary tillage such as plowing produces a larger subsurface difference and tends to produce a rough surface finish, whereas secondary tillage tends to produce a smoother surface finish, such as that required to make a good seedbed for many crops. Harrowing and rototilling often combine primary and secondary tillage into one operation.

Wheels are often integral with tillage implements and are used for both transportation of the implement on road and between fields, and for depth control of the tillage implements in the field. Because tillage implements are generally too wide to travel on roads between fields, tillage implements may be operable to fold up into a folded transport configuration, so that portions or wings of the framework that carries the field working devices, such as cultivator shanks, are stacked on top of, or otherwise carried by, the center frame section of the tillage implement. In this configuration, the main lift wheels may extend downwards using hydraulic cylinders and lift wheel arms, lifting the tillage implement, its wings, and all of its field working devices clear of the ground or road surface. The prior art includes various arrangements of such extendible main lift wheels, lift wheel arms, and hydraulic cylinders. However, in order to support the weight of the entire tillage implement and its wings, the mounting structures connecting the hydraulic cylinders to the center frame section of the tillage implement in such prior art arrangements are often substantial, heavy, and costly.

What is needed in the art is a main lift wheel, lift wheel arm, hydraulic cylinder, and mounting arrangement that efficiently transfers the force needed to lift the weight of the tillage implement and its wings to the center frame section of the implement without requiring expensive and heavy mounting bracketry or devices.

SUMMARY OF THE INVENTION

Embodiments of the present invention provide an agricultural implement having a center section and folding wing sections. The folding wing sections are operable to fold into a transport configuration wherein the wing sections are stacked on or otherwise carried by the center section, and to unfold into an operating configuration. A set of rear main lift wheels is connected to rear lift wheel arms, the rear lift wheel arms being connected to the center section, and being actuated by main hydraulic lift cylinders. The rear main lift wheels are operable to raise and lower the center section of the agricultural implement, and the entire agricultural implement when it is in the folded transport configuration, by extending and contracting the main hydraulic lift cylinders, thereby pivoting the rear lift wheel arms between a raised position and a lowered position.

A pull hitch is attached to the center section of the agricultural implement, so that the agricultural implement may be pulled by a traction unit, such as an agricultural tractor. The pull hitch may be hinged so that it raises the front of the agricultural implement when rotated downward, and lowers the front of the agricultural implement when rotated upward. Each of the rear lift wheel arms may be connected to the center section of the agricultural implement through a rockshaft, which serves to coordinate the motion of the rear lift wheel arms, thereby keeping the agricultural implement level on the rear main lift wheels. In an embodiment of the agricultural implement wherein the pull hitch is hinged, the rockshaft may also be connected to a rockshaft to hinged pull hitch link, which transmits motion forward to a bell crank when the rear lift wheel arms are extended. The bell crank, in turn, transmits motion through a turnbuckle to the hinged pull hitch. By extending the main hydraulic lift cylinders and rotating the rear lift wheel arms downwards, the rockshaft pivots the rockshaft to hinged pull hitch link forward. The rockshaft to hinged pull hitch link, acting through the link to hitch bell crank and a bell crank to hinged pull hitch turnbuckle, thereby rotates the pull hitch downward about the pull hitch hinge. This action further lifts the front of the field cultivator, providing additional clearance above the ground surface for cultivator shanks and shovels attached to the main shank frame of the center section.

The center section of the agricultural implement includes a main shank frame made up of longitudinal frame members and cross frame members. The longitudinal frame members may be in the form of trusses, having upper members and lower members interconnected by plates and/or by the perpendicular cross frame members. In order to distribute the force provided by the large bore main hydraulic lift cylinders necessary to lift the agricultural implement into the main shank frame or frame of the center section without requiring the use of large, heavy, and expensive mounting brackets, an arrangement including a lug, a lug anchor, and connecting load members is used for each main hydraulic lift cylinder. Each main hydraulic lift cylinder is connected to an approximately center pivot point of its lug. The lug is provided with a lower connection point, which connects to a lug anchor that is attached to one of the rearward cross members of the main shank frame. The lug is further provided with an upper connection point, which connects to at least two connecting load members.

The at least two connecting load members extend diagonally forward from the lug to adjacent longitudinal frame members, where they attach to connecting load member attachment plates. The connecting load member attachment plates are attached to longitudinal frame members of the main shank frame of the center frame section on either side of the lug and main hydraulic lift cylinders. The connecting load member attachment plates may, when used with an embodiment of a main shank frame having longitudinal frame members in the form of trusses having upper members and lower members, connect to the upper members and lower members.

Further, the connecting load member attachment plates may attach to the longitudinal frame members at a point where a cross frame member passes through the longitudinal frame member so that the connecting load member attachment plate extends forward of the cross frame member in its attachment to the longitudinal frame member and wraps around the cross frame member, both above and below the cross frame member. In this embodiment, the connecting load member attachment plate describes a "hook" around the cross frame member. The connecting load member attachment plate may be welded to the longitudinal frame member or to the cross frame member, or to both. The connecting load member attachment plate may extend upwards and rearwards at an angle from the longitudinal frame member and inwards at an angle towards the lug, providing an attachment point for the connecting load members.

By splitting the forward portion of the load transmitted by the lugs connected to the main hydraulic lift cylinders, and delivering it to longitudinal frame members at a point where they intersect a cross member, instead of delivering the load straight forward to the midpoint of the cross member, much of the force is delivered to the longitudinal frame members which react in compression, i.e.—in a straight line. The force tending to pull the longitudinal frame members towards one another is reacted to in compression by the cross member between the longitudinal frame members. This is as opposed to a single connecting load member attached to the cross member midway between the two longitudinal frame members, wherein the cross member must bear the load in bending.

The hydraulic lift cylinder, lift wheel arm, lug, lug anchor, and connecting load member arrangements described may also be used with the wing lift wheels and wing lift wheel lift arms, which wing lift wheels are used to raise and lower the folding wing sections when they are in the unfolded operating configuration. Further, the main hydraulic lift cylinder, rear lift wheel arm, lug, lug anchor, and connecting load member arrangement may be used with other types of agricultural or industrial implements wherein it is advantageous to raise and lower the implement while spreading the load over the frame of the implement.

The invention in one form is directed to an agricultural or industrial implement having a main frame including at least two longitudinal frame members, at least one fore cross frame member, and at least one aft cross frame member. The agricultural or industrial implement has at least one rear main lift wheel connected to at least one rear lift wheel arm. Each of the rear lift wheel arms is pivotally connected to the main frame and can be actuated between a raised position and a lowered position using a hydraulic lift cylinder. Each hydraulic lift cylinder is connected to a center pivot of a lug. The lug has a lower connection point connected to a lug anchor, which is in turn connected to the at least one aft cross frame member. The lug also has an upper connection point connected to at least two connecting load members. One of the connecting load members extends diagonally forward from the upper connection point of the lug and connects to one of the at least two longitudinal frame members located to the left of the lug. Another of the connecting load members extends diagonally forward from the upper connection point of the lug and connects to one of said at least two longitudinal frame members located to the right of the lug.

The invention in another form is directed to a main lift wheel assembly of an agricultural or industrial implement having a main frame including at least two longitudinal frame members, at least one fore cross frame member, and at least one aft cross frame member, and a pull hitch extending forward from the main frame. The main lift wheel assembly includes at least one rear main lift wheel connected to at least one rear lift wheel arm. Each rear lift wheel arm is pivotally connected to the main frame and can be actuated between a raised position and a lowered position using a hydraulic lift cylinder. Each hydraulic lift cylinder is connected to a center pivot of a lug. The lug has a lower connection point connected to a lug anchor, which is in turn connected to the at least one aft cross frame member. The lug also has an upper connection point connected to at least two connecting load members. One of the connecting load members extends diagonally forward from the upper connection point of the lug and connects to one of the at least two longitudinal frame members located to the left of the lug. Another of the connecting load members extends diagonally forward from the upper connection point of the lug and connects to one of the at least two longitudinal frame members located to the right of the lug.

The invention in another form is directed to a method of providing an agricultural or industrial implement that is reconfigurable between an operating configuration and a transport configuration. The method includes several steps. The first step is providing a main frame including at least two longitudinal frame members, at least one fore cross frame member, and at least one aft cross frame member. The second step is providing at least one rear main lift wheel connected to at least one rear lift wheel arm. The third step is pivotally connecting each rear lift wheel arm to the main frame and actuating each rear lift wheel arm between a raised position when in the transport configuration and a lowered position when in the operating configuration using a hydraulic lift cylinder. The fourth step is connecting each hydraulic lift cylinder to a center pivot of a lug. The fifth step is connecting a lower connection point of each lug to a lug anchor. The sixth step is connecting each lug anchor to at least one aft cross frame member. The seventh step is connecting an upper connection point of each lug to at least two connecting load members. The eighth step is extending one of the two connecting load members diagonally forward from the upper connection point of each lug and connecting it to one of the longitudinal frame members located to the left of the lug. The ninth step is extending another of the two connecting load members diagonally forward from the upper connection point of each lug and connecting it to one of the longitudinal frame members located to the right of the lug.

One advantage of the present invention is that the high loads generated by the main hydraulic lift cylinders are more evenly spread through the main frame of the center frame section of the agricultural tillage implement by way of the at least two connecting load members per lug. Another advantage is that the load is transmitted directly to the longitudinal frame members which react in compression, rather than to cross frame members reacting in bending. Still another advantage is that the hydraulic lift cylinder, lift wheel arm, lug, lug anchor, and connecting load member arrangements described evenly distribute the high loads generated by the main hydraulic lift cylinders through the main frame, thereby eliminating the need for heavy and expensive structural members and brackets.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
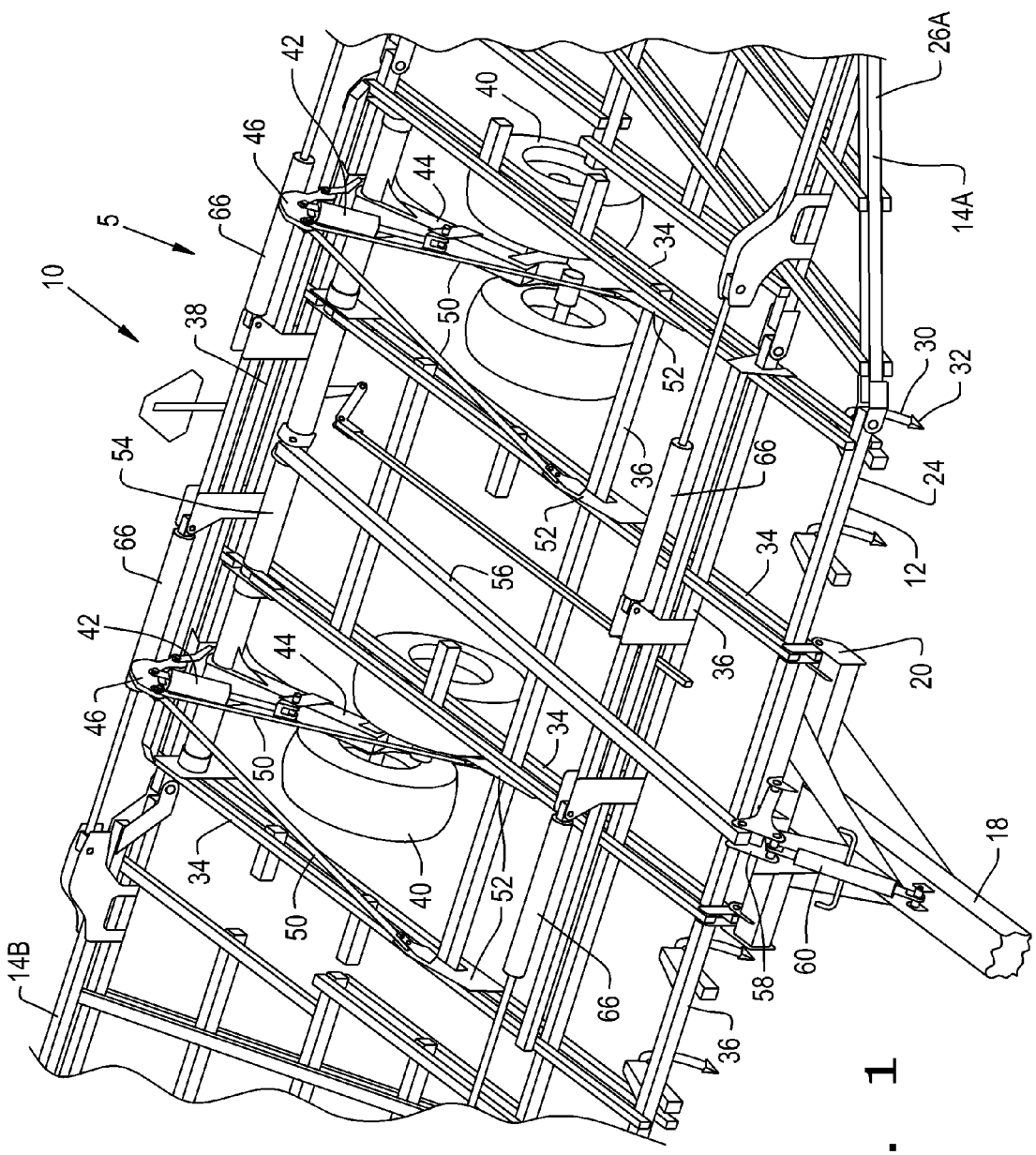
FIG. 1 is a top front isometric view of a center frame section of an agricultural tillage implement according to an embodiment of the invention.
Figure 2:
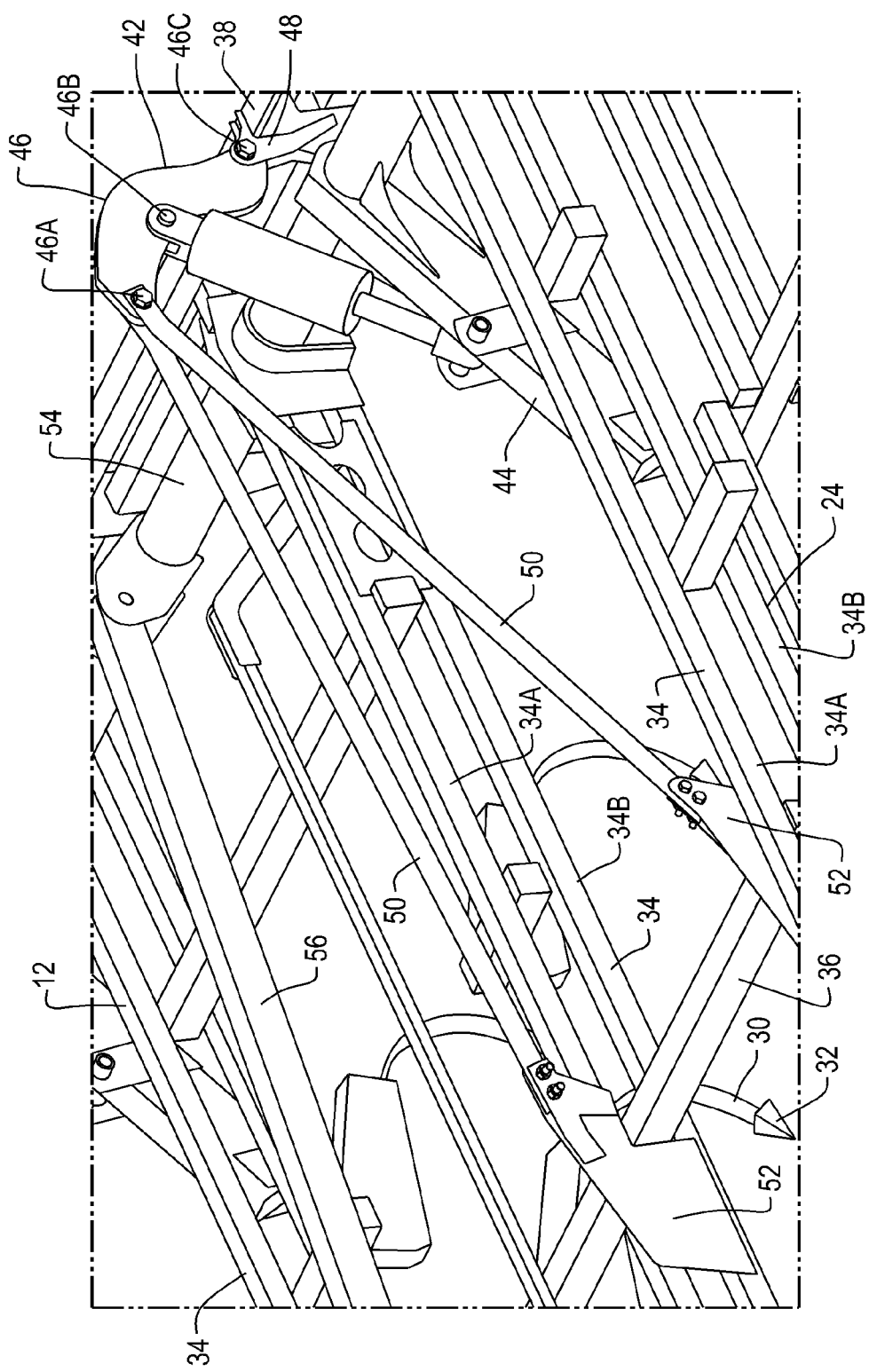
FIG. 2 is an isometric view of a rear lift wheel arm and main hydraulic lift cylinder arrangement according to an embodiment of the invention.
Figure 3:
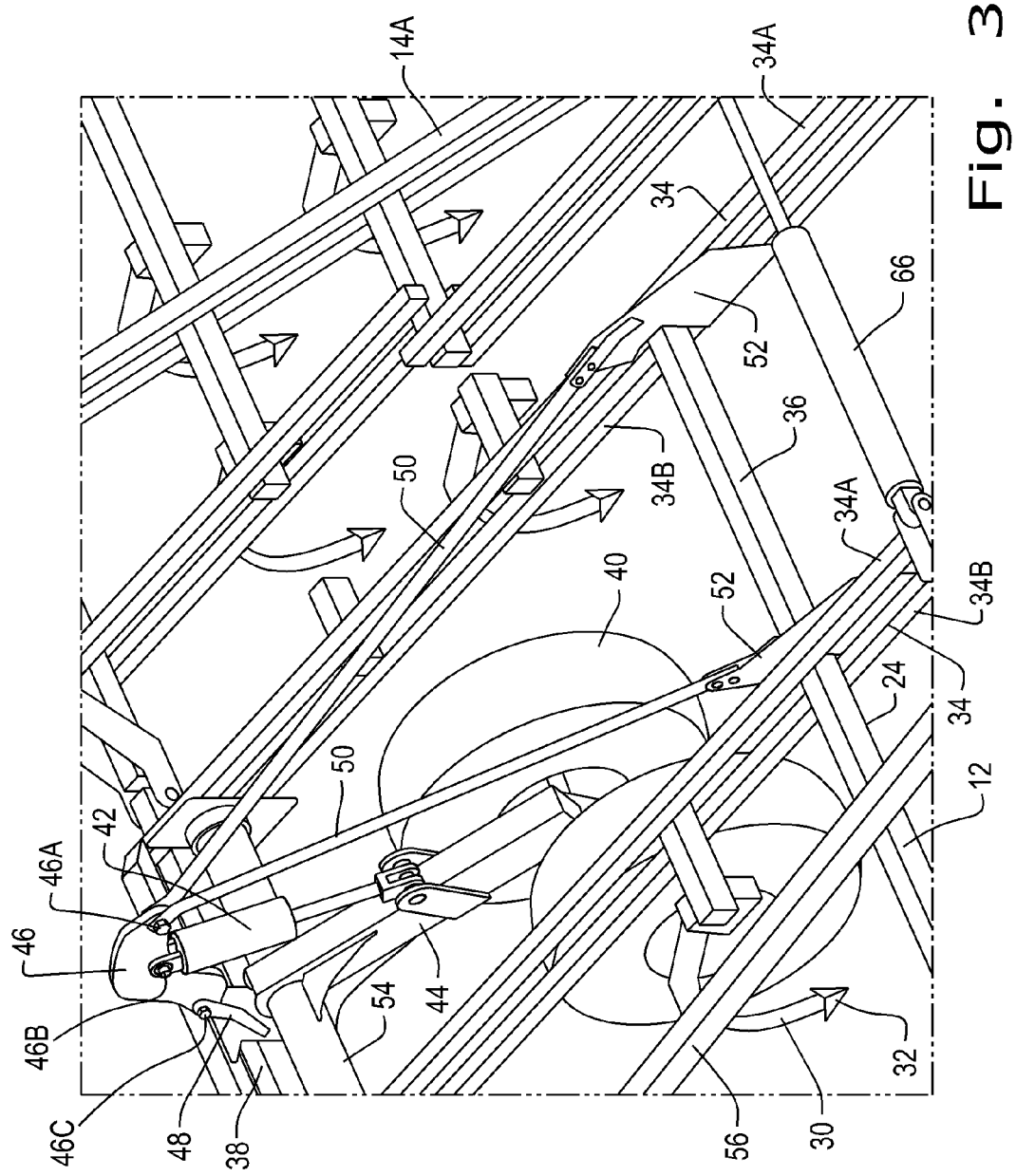
FIG. 3 is an isometric view of a rear lift wheel arm and main hydraulic lift cylinder arrangement according to an embodiment of the invention.
Figure 4:
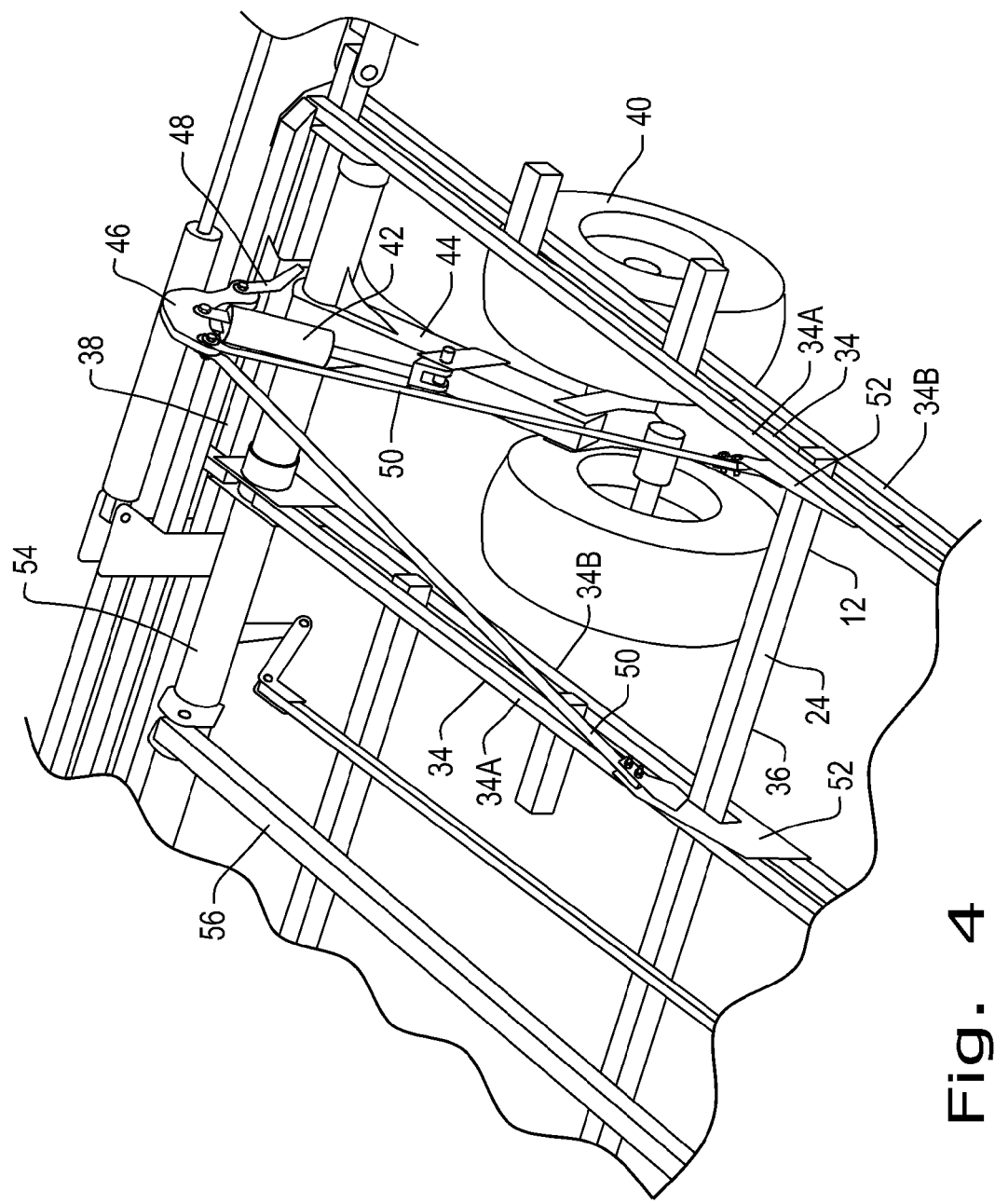
FIG. 4 is an isometric view of a rear lift wheel arm and main hydraulic lift cylinder arrangement according to an embodiment of the invention.
Figure 5:
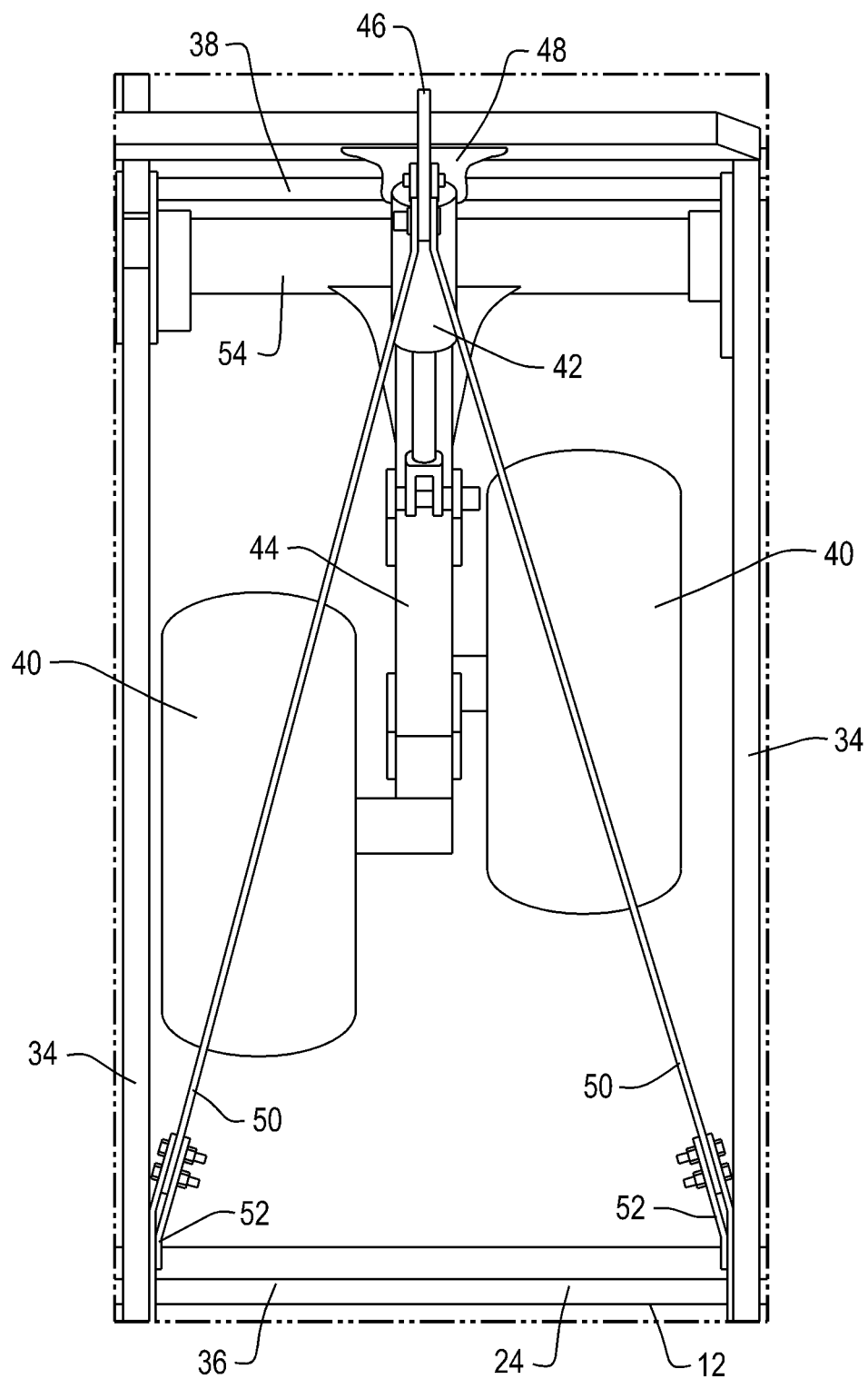
FIG. 5 is a top view of a rear lift wheel arm and main hydraulic lift cylinder arrangement according to an embodiment of the invention.

Referring now to the drawings, and more particularly to FIGS. 1-5, there is shown an agricultural tillage implement 5 according to an embodiment of the present invention, in the form of a field cultivator 10 for tilling and finishing soil prior to seeding. The field cultivator 10 is configured as a multi-section field cultivator, and includes a center frame section 12, left inner wing section 14A, right inner wing section 14B, left outer wing section 16A (not shown), and right outer wing section 16B (not shown). Center frame section 12 is the center section that is directly towed by a traction unit, such as an agricultural tractor (not shown), in a travel direction 22. Center frame section 12 carries main shank frame 24 for tilling the soil, and is connected to pull hitch 18, which extends forward from main shank frame 24 of center frame section 12 in travel direction 22. Pull hitch 18 may be connected to the center frame section 12 by way of a pull hitch hinge 20. Main shank frame 24 carries cultivator shanks 30 with shovels 32 at their lower ends for tilling the soil, as do the wing shank frames 26A, 26B, 28A, and 28B (not shown).

Main shank frame 24 includes longitudinal frame members 34, fore cross frame members 36, and aft cross frame members 38. Note that longitudinal frame members 34 may be in the form of trusses, such that longitudinal frame member 34 includes an upper member 34A and a lower member 34B interconnected by plates and/or by the perpendicular cross frame members 36, 38. Rear main lift wheels 40 are used for raising and lowering the main shank frame 24 using main hydraulic lift cylinders 42 connected to rear lift wheel arms 44. Rear lift wheel arms 44 may be attached to a rockshaft 54, which serves to coordinate motion between the rear lift wheel arms 44, and may further actuate a rockshaft to hinged pull hitch link 56. The rockshaft to hinged pull hitch link 56 transmits motion to the hinged pull hitch 18 by way of a link to hitch bell crank 58 and a bell crank to hinged pull hitch turnbuckle 60, causing the pull hitch 18 to rotate about the pull hitch hinge 20. Front gauge wheels 62 are used to level the field cultivator 10 fore and aft during a field operation.

During use, it is periodically necessary to move the field cultivator 10 from an unfolded (operating) position to a folded (transport) position. First, each outer wing section 16A and 16B (not shown) are folded approximately 180° laterally inward and over a respective inner wing section 14A and 14B, using outer wing fold cylinders 68 (not shown). With the outer wing sections 16A and 16B in the folded state, the inner wing sections 14A and 14B are then folded inward over the center frame section 12 using inner wing fold cylinders 66. To unfold the field cultivator 10 and reconfigure the field cultivator 10 back to the field or operating position, the folding sequence described above is simply reversed.

Commonly the wing sections 14A, 14B, 16A, and 16B are placed in the folded transport position when the field cultivator 10 is prepared for transport between fields. At this point, the main hydraulic lift cylinders 42 lift the entire weight of the field cultivator 10 onto the rear main lift wheels 40, which weight may be substantial. Further, by extending the main hydraulic lift cylinders 42 and rotating the rear lift wheel arms 44 downwards, the rockshaft 54 pivots the rockshaft to hinged pull hitch link 56 forward. The rockshaft to hinged pull hitch link 56, acting through the link to hitch bell crank 58 and a bell crank to hinged pull hitch turnbuckle 60, thereby rotates the pull hitch 18 downward about the pull hitch hinge 20. This action further lifts the front of the field cultivator 10, providing additional clearance above the ground surface for the cultivator shanks 30 and shovels 32.

Therefore, all of the force necessary to raise the body of the field cultivator 12, including the wing sections 14A, 14B, 16A, and 16B, as well as the force necessary to lift the front of the field cultivator using the hinged pull hitch 18, is generated by the two main hydraulic lift cylinders 42. In order to provide an anchor point for the two main hydraulic lift cylinders 42, while distributing the reaction force over a greater part of the main shank frame 24 of the center frame section, lugs 46 are provided each having a center pivot point 46B to which the main hydraulic lift cylinder 42 is connected. The lugs 46 also have end connection points 46A, 46C, the lower one 46C of which is connected to a lug anchor 48 attached to an aft cross frame member 38, and the upper one 46A of which is connected to connecting load members 50.

In the embodiment of the present invention shown, there are two connecting load members 50 for each lug 46, which are connected to the uppermost connection point 46A of the lug 46 and extend diagonally forward to connecting load member attachment plates 52. The connecting load member attachment plates 52 are attached to longitudinal frame members 34 of the main shank frame 24 of the center frame section 12 on either side of the lug 46 and main hydraulic lift cylinders 42. The connecting load member attachment plates 52 may, when used with a main shank frame 24 having longitudinal frame members 34 in the form of trusses having upper members 34A and lower members 34B, connect to the upper members 34A and lower members 34B.

Further, the connecting load member attachment plates 52 may attach to the longitudinal frame members 34 at a point where a fore cross frame member 36 passes through the longitudinal frame member 34 so that the connecting load member attachment plate 52 extends forward of the fore cross frame member 36 in its attachment to the longitudinal frame member 34 and wraps around the fore cross frame member 36, both above and below the fore cross frame member 36. In this embodiment, the connecting load member attachment plate 52 describes a "hook" around the fore cross frame member 36. The connecting load member attachment plate 52 may be welded to the longitudinal frame member 34 or to the fore cross frame member 36, or to both. The connecting load member attachment plate 52 may extend upwards and rearwards at an angle from the longitudinal frame member 34 and inwards at an angle towards the lug 46, providing an attachment point for the connecting load members 50.

Figure 6:
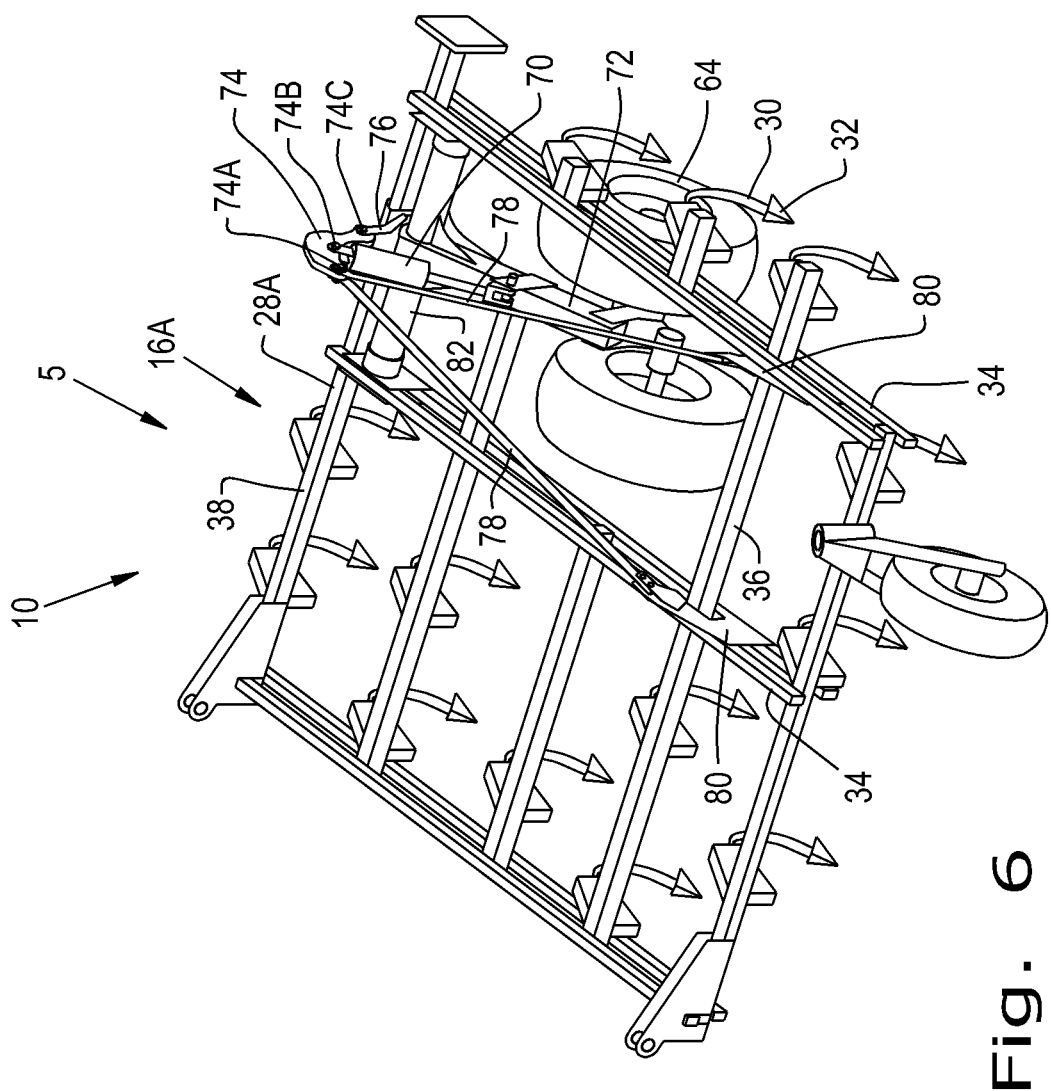
FIG. 6 is a top front isometric view of a wing frame section of an agricultural tillage implement according to an embodiment of the invention.

Turning now to FIG. 6, left outer wing section 16A is shown, illustrating how wing lift wheels 64 are used for raising and lowering the left outer wing shank frame 28A using wing hydraulic lift cylinders 70 connected to wing lift arms 72. Each wing lift wheel 64 of left inner wing section 14A, right inner wing section 14B, left outer wing section 16A, and right outer wing section 16B (not shown) has a similar wing hydraulic lift cylinder 70 actuating a wing lift wheel arm 72. Left inner wing shank frame 26A, right inner wing shank frame 26B, left outer wing shank frame 28A, and right outer wing shank frame 28B (not shown) are thereby raised and lowered using wing hydraulic lift cylinders 70 connected to wing lift wheel arms 72. Wing lift wheel arms 72 may again be attached to a rockshaft 82.

Each wing hydraulic lift cylinder 70 may be connected to a lug 74, lug anchor 76, and connecting load member 78 arrangement similar to the lug 46, lug anchor 48, and connecting load members 50 used with the main hydraulic lift cylinders 42. Lugs 74 each have a center pivot point 74B to which the wing hydraulic lift cylinder 70 is connected. The lug 74 also has end connection points 74A, 74C, the lower one 76C of which is connected to the lug anchor 76 attached to an aft cross frame member 38, and the upper one 74A of which is connected to connecting load members 78. Due to the lighter load of wing hydraulic lift cylinder 70 supporting the wing section 14A, 14B, 16A, or 16B, only a single connecting load member attached to a fore cross frame member 36 may be used. Alternately, as shown, two connecting load members 78 may be used for each lug 74 of each wing hydraulic lift cylinder 70, along with connecting load member attachment plates 80 attached to longitudinal frame members 34, in the same way that such lug 46, lug anchor 48, connecting load members 50, and connecting load member attachment plates 52 are used with the main hydraulic lift cylinders 42.

Note that longitudinal frame members 34 of wing sections 14A, 14B, 16A, and 16B may again be in the form of trusses, such that longitudinal frame member 34 includes an upper member 34A and a lower member 34B interconnected by plates and/or by the perpendicular cross frame members 36, 38. As with the center frame section 12, the connecting load member attachment plates 80 may attach to the longitudinal frame members 34 at a point where a fore cross frame member 36 passes through the longitudinal frame member 34 so that the connecting load member attachment plate 80 extends forward of the fore cross frame member 36 in its attachment to the longitudinal frame member 34 and wraps around the fore cross frame member 36, both above and below the fore cross frame member 36. In this embodiment, the connecting load member attachment plate 80 also describes a "hook" around the fore cross frame member 36. The connecting load member attachment plate 80 may be welded to the longitudinal frame member 34 or to the fore cross frame member 36, or to both. The connecting load member attachment plate 80 may extend upwards and rearwards at an angle from the longitudinal frame member 34 and inwards at an angle towards the lug 74, providing an attachment point for the connecting load members 78.

Although the rear main lift wheels 40 using main hydraulic lift cylinders 42 connected to rear lift wheel arms 44 and to lugs 46 connected to lug anchors 48 and to at least two connecting load members 50, and the wing lift wheels 62 using wing hydraulic lift cylinders 70 connected to wing lift wheel arms 72 and to lugs 74 connected to lug anchors 76 and to at least two connecting load members 78 as described above are shown used with an agricultural tillage implement 5 in the form of a field cultivator 10, it is contemplated that this arrangement may be employed in any agricultural or industrial implement wherein it is advantageous to raise and lower the implement while spreading the load over the frame of the implement.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural or industrial implement, comprising:
 a main frame including at least two longitudinal frame members, at least one fore cross frame member, and at least one aft cross frame member;
 at least one rear main lift wheel connected to at least one rear lift wheel arm, the at least one rear lift wheel arm being pivotally connected to the main frame and being actuated between a raised position and a lowered position by at least one hydraulic lift cylinder;
 the at least one hydraulic lift cylinder being connected to a center pivot of a lug, the lug having a lower connection point being connected to a lug anchor, the lug anchor being connected to the at least one aft cross frame member, the lug having an upper connection point being connected to at least two connecting load members;
 one of the at least two connecting load members extending diagonally forward from the upper connection point of the lug and connecting to one of the at least two longitudinal frame members located to the left of the lug; and
 another of the at least two connecting load members extending diagonally forward from the upper connection point of the lug and connecting to one of the at least two longitudinal frame members located to the right of the lug;

wherein the connecting load member is connected to the longitudinal frame member located to the left of the lug via a left attachment plate, and the connecting load member is connected to the longitudinal frame member located to the right of the lug via a right attachment plate;

wherein the longitudinal frame member located to the left of the lug and the longitudinal frame member located to the right of the lug are each in the form of a truss with an upper longitudinal frame member and a lower longitudinal frame member; and wherein the left attachment plate is attached to the upper longitudinal frame member and to the lower longitudinal frame member of the longitudinal frame member located to the left of the lug, and the right attachment plate is attached to the upper longitudinal frame member and to the lower longitudinal frame member of the longitudinal frame member located to the right of the lug.

2. The agricultural or industrial implement of claim 1, wherein:

the left attachment plate is attached to the longitudinal frame member located to the left of the lug at a point where the longitudinal frame member intersects the at least one fore cross frame member; and the right attachment plate is attached to the longitudinal frame member located to the right of the lug at a point where the longitudinal frame member intersects the at least one fore cross frame member.

3. The agricultural or industrial implement of claim 2, wherein:

the left attachment plate and the right attachment plate forms a hook about the at least one fore cross frame member.

4. The agricultural or industrial implement of claim 1, wherein:

the at least one rear main lift wheel and the at least one rear lift wheel arm further comprises at least two rear main lift wheels and at least two rear lift wheel arms.

5. The agricultural or industrial implement of claim 4, wherein:

the at least two rear lift wheel arms are pivotally connected to the main frame using a rockshaft, the rockshaft coordinates the motion of the at least two rear lift wheel arms.

6. The agricultural or industrial implement of claim 5, further comprising:

a hinged pull hitch extending forward from the main frame; and a linkage assembly connected to the rockshaft and to the hinged pull hitch, the linkage assembly causing the hinged pull hitch to rotate downward when the at least two rear lift wheel arms are rotated into the lowered position.

7. The agricultural or industrial implement of claim 1, further comprising:

at least one wing section.

8. The agricultural or industrial implement of claim 7, wherein:

the at least one wing section having a wing frame including at least two longitudinal wing frame members, at least one fore wing cross frame member, and at least one aft wing cross frame member;

the at least one wing section having at least one rear wing lift wheel connected to at least one wing lift wheel arm, the at least one wing lift wheel arm being pivotally connected to the wing frame and being actuated between a raised position and a lowered position by at least one hydraulic wing lift cylinder;

the at least one hydraulic wing lift cylinder being connected to a center pivot of a wing lug, the wing lug having a lower connection point being connected to a wing lug anchor, the wing lug anchor being connected to the at least one aft wing cross frame member, the wing lug having an upper connection point being connected to at least two wing connecting load members;

one of the at least two wing connecting load members extending diagonally forward from the upper connection point of the wing lug and connecting to one of the at least two longitudinal wing frame members located to the left of the wing lug; and another of the at least two wing connecting load members extending diagonally forward from the upper connection point of the wing lug and connecting to one of the at least two longitudinal wing frame members located to the right of the wing lug.

9. A main lift wheel assembly of an agricultural or industrial implement comprising:

a main frame including at least two longitudinal frame members, at least one fore cross frame member, and at least one aft cross frame member, and a pull hitch extending forward from the main frame;

at least one rear main lift wheel connected to at least one rear lift wheel arm, the at least one rear lift wheel arm being pivotally connected to the main frame and being actuated between a raised position and a lowered position by at least one hydraulic lift cylinder;

the at least one hydraulic lift cylinder being connected to a center pivot of a lug, the lug having a lower connection point being connected to a lug anchor, the lug anchor being connected to the at least one aft cross frame member, the lug having an upper connection point being connected to at least two connecting load members;

one of the at least two connecting load members extending diagonally forward from the upper connection point of the lug and connecting to one of the at least two longitudinal frame members located to the left of the lug; and another of the at least two connecting load members extending diagonally forward from the upper connection point of the lug and connecting to one of the at least two longitudinal frame members located to the right of the lug;

wherein the connecting load member is connected to the longitudinal frame member located to the left of the lug via a left attachment plate, and the connecting load member is connected to the longitudinal frame member located to the right of the lug via a right attachment plate;

wherein the longitudinal frame member located to the left of the lug and the longitudinal frame member located to the right of the lug are each in the form of a truss with an up per longitudinal frame member and a lower longitudinal frame member; and wherein the left attachment plate is attached to the upper longitudinal frame member and to the lower longitudinal frame member of the longitudinal frame member located to the left of the lug, and the right attachment plate is attached to the upper longitudinal frame member and to the lower longitudinal frame member of the longitudinal frame member located to the right of the lug.

10. The main lift wheel assembly of claim 9, wherein:
the left attachment plate is attached to the longitudinal frame member located to the left of the lug at a point where the longitudinal frame member intersects the at least one fore cross frame member; and
the right attachment plate is attached to the longitudinal frame member located to the right of the lug at a point where the longitudinal frame member intersects the at least one fore cross frame member.

11. The main lift wheel assembly of claim 10, wherein:
the left attachment plate and the right attachment plate form a hook about the at least one fore cross frame member.

12. The main lift wheel assembly of claim 9, wherein:
the at least one rear main lift wheel and the at least one rear lift wheel arm further comprises at least two rear main lift wheels and at least two rear lift wheel arms.

13. The main lift wheel assembly of claim 12, wherein:
the at least two rear lift wheel arms are pivotally connected to the main frame using a rockshaft, the rockshaft coordinating the motion of the at least two rear lift wheel arms.

14. The main lift wheel assembly of claim 13, further comprising:
a hinge connecting the pull hitch to the main frame; and
a linkage assembly connected to the rockshaft and to the hinged pull hitch, the linkage assembly causing the hinged pull hitch to rotate downward when the at least two rear lift wheel arms are rotated into the lowered position.

\* \* \* \* \*